United States Patent
Chen et al.

(10) Patent No.: US 10,883,367 B2
(45) Date of Patent: Jan. 5, 2021

(54) PAIRED AIR PRESSURE ENERGY STORAGE DEVICE, INSPECTION METHOD AND BALANCE DETECTION MECHANISM THEREOF

(71) Applicants: Weilun Chen, Beijing (CN); Tailun Chen, Beijing (CN); Huiqin Li, Beijing (CN); Steve Jun Chen, Beijing (CN)

(72) Inventors: Weilun Chen, Beijing (CN); Tailun Chen, Beijing (CN); Huiqin Li, Beijing (CN); Steve Jun Chen, Beijing (CN)

(*) Notice: Subject to any disclaimer, the term of this patent is extended or adjusted under 35 U.S.C. 154(b) by 277 days.

(21) Appl. No.: 16/103,660

(22) Filed: Aug. 14, 2018

(65) Prior Publication Data

US 2018/0355721 A1 Dec. 13, 2018

Related U.S. Application Data

(63) Continuation of application No. PCT/CN2017/073460, filed on Feb. 14, 2017.

(30) Foreign Application Priority Data

Feb. 14, 2016 (CN) .......................... 2016 1 0084601

(51) Int. Cl.
*F17C 1/00* (2006.01)
*F01B 23/10* (2006.01)
(Continued)

(52) U.S. Cl.
CPC .............. *F01B 23/10* (2013.01); *F01B 17/02* (2013.01); *F01B 29/10* (2013.01); *F02C 6/16* (2013.01);
(Continued)

(58) Field of Classification Search
CPC ...... F17C 2203/0383; F17C 2203/0629; F17C 2260/016; F17C 2201/0166; F17C 2205/0149; B65D 90/52; B63B 25/14
(Continued)

(56) References Cited

U.S. PATENT DOCUMENTS 3,187,766 A * 6/1965 Black ...................... B60P 3/225
137/267
3,472,414 A * 10/1969 Rodrigues ............... F17C 1/002
220/581

(Continued)

FOREIGN PATENT DOCUMENTS

| CN | 2575641 Y | 9/2003 |
|---|---|---|
| CN | 101458140 A | 6/2009 |

(Continued)

*Primary Examiner* — Michael Leslie
*Assistant Examiner* — Michael Quandt
(74) *Attorney, Agent, or Firm* — Wayne & Ken, LLC; Tony Hom

(57) ABSTRACT

The invention discloses a paired air pressure energy storage device, an inspection method and a balance detection mechanism thereof. The paired air pressure energy storage device includes an inner body and an outer body sleeved outside the inner body. The inner body is filled with a first gas. A cavity formed between the outer body and the inner body is filled with a second gas. There is a gas energy pressure difference between the first gas and the second gas. The gas energy pressure difference is relative pressure gas energy. The invention can store two gases with different pressure intensities, has a simple structure, is convenient for transportation, and is favorable for effective energy storage and long-term storage of gases.

16 Claims, 15 Drawing Sheets

(51) Int. Cl.

| | | |
|---|---|---|
| *F17C 13/02* | (2006.01) | |
| *F03B 13/18* | (2006.01) | |
| *G05D 16/00* | (2006.01) | |
| *G05D 16/10* | (2006.01) | |
| *F04B 17/02* | (2006.01) | |
| *F03D 9/28* | (2016.01) | |
| *F03B 17/06* | (2006.01) | |
| *F03D 9/00* | (2016.01) | |
| *F17C 13/12* | (2006.01) | |
| *F03D 9/17* | (2016.01) | |
| *F04B 41/02* | (2006.01) | |
| *F01B 17/02* | (2006.01) | |
| *F01B 29/10* | (2006.01) | |
| *F02C 6/16* | (2006.01) | |
| *F03D 1/06* | (2006.01) | |
| *F03D 1/02* | (2006.01) | |
| *F15B 1/02* | (2006.01) | |

(52) U.S. Cl.
CPC ........ *F03B 13/1815* (2013.01); *F03B 17/063* (2013.01); *F03D 9/008* (2013.01); *F03D 9/17* (2016.05); *F03D 9/28* (2016.05); *F04B 17/02* (2013.01); *F04B 41/02* (2013.01); *F17C 1/007* (2013.01); *F17C 13/025* (2013.01); *F17C 13/12* (2013.01); *G05D 16/028* (2019.01); *G05D 16/10* (2013.01); *F03D 1/025* (2013.01); *F03D 1/065* (2013.01); *F05B 2210/16* (2013.01); *F05B 2220/708* (2013.01); *F05B 2240/211* (2013.01); *F05B 2240/302* (2013.01); *F05B 2240/40* (2013.01); *F05B 2240/95* (2013.01); *F05B 2260/40* (2013.01); *F15B 1/024* (2013.01); *F17C 2201/0104* (2013.01); *F17C 2201/0109* (2013.01); *F17C 2201/0166* (2013.01); *F17C 2201/054* (2013.01); *F17C 2203/0629* (2013.01); *F17C 2203/0631* (2013.01); *F17C 2205/0138* (2013.01); *F17C 2205/0149* (2013.01); *F17C 2221/014* (2013.01); *F17C 2221/017* (2013.01); *F17C 2221/03* (2013.01); *F17C 2221/031* (2013.01); *F17C 2223/0123* (2013.01); *F17C 2223/033* (2013.01); *F17C 2223/035* (2013.01); *F17C 2223/036* (2013.01); *F17C 2223/038* (2013.01); *F17C 2225/0123* (2013.01); *F17C 2225/033* (2013.01); *F17C 2225/035* (2013.01); *F17C 2225/036* (2013.01); *F17C 2225/038* (2013.01); *F17C 2227/0157* (2013.01); *F17C 2250/0434* (2013.01); *F17C 2260/016* (2013.01); *F17C 2260/042* (2013.01); *F17C 2270/0121* (2013.01); *F17C 2270/0147* (2013.01); *F17C 2270/0581* (2013.01)

(58) Field of Classification Search
USPC ............ 220/918, 901, 921, 560.1, 592, 586, 220/560.12
See application file for complete search history.

(56) References Cited

U.S. PATENT DOCUMENTS

| | | |
|---|---|---|
| 4,206,608 A | 6/1980 | Bell |
| 9,878,725 B2 * | 1/2018 | Cook ..................... B61C 17/00 |

FOREIGN PATENT DOCUMENTS

| | | |
|---|---|---|
| CN | 101775998 A | 7/2010 |
| CN | 104024577 A | 9/2014 |
| CN | 105299945 A | 2/2016 |

* cited by examiner

PAIRED AIR PRESSURE ENERGY STORAGE DEVICE, INSPECTION METHOD AND BALANCE DETECTION MECHANISM THEREOF

CROSS-REFERENCE TO RELATED APPLICATIONS

This application is a continuation of International Application No. PCT/CN2017/073460 with a filing date of Feb. 14, 2017, designating the United States, now pending, and further claims priority to Chinese application no. 201610084601.4 with a filing date of Feb. 14, 2016. The content of the aforementioned applications, including any intervening amendments thereto, are incorporated herein by reference.

TECHNICAL FIELD

The invention relates to a gas energy storage device and an inspection method, and more particularly to a paired air pressure energy storage device, an inspection method, a relative pressure gas energy storage system and a balance detection mechanism thereof applied in the field of gas energy source storage.

BACKGROUND OF THE INVENTION

The world's new energy sources are gradually developing towards the replacement of traditional energy sources. Due to the intermittent nature inherent in the production of renewable energy sources, its availability and accessibility are significantly reduced. It is directly related to the practicality of the new energy sources to solve the problem of energy storage in the production, transportation and use cycle of renewable energy sources.

The existing gas energy storage systems are mainly divided into three types:

1) The first type is a conventional high-pressure compressed air energy system having wind power or electric power as its gas source power, in which ambient air is compressed into an air reservoir by a compressor and stored as high-pressure compressed air energy, and then the high-pressure air energy is applied to a generator or a pneumatic machine through an expander to do work, with a thermal system efficiency of about 50%;

2) The second type is an adiabatic high-pressure compressed air energy system, having wind power or electric power as its gas source power, in which ambient air is compressed into an air reservoir by a compressor and stored as high-temperature, high-pressure compressed air energy, where a large amount of thermal energy generated during compression is stored in a high-temperature medium for use in an air energy recovery process, so as to improve the overall energy efficiency of the system, and the air energy can be applied to a generator or a pneumatic machine through an expander to do work, with a thermal system efficiency of about 70%; and 3) The third type is a high-pressure compressed air energy system for supercritical low-temperature adiabatic air, having wind power or electric power as its gas source power, in which ambient air is compressed into a liquefied state by a compressor and delivered into an air reservoir to be stored as ultra-low temperature liquefied air, thus significantly reducing the volume of the air reservoir, where a large amount of low-temperature energy generated during compression is stored in a low-temperature medium reservoir for use in an air energy recovery process, so as to improve the overall energy efficiency of the system, and then the air energy can be applied to a generator or a pneumatic machine through an expander to do work, with a thermal system efficiency of about 70%.

Thus, the above three types of storage systems all have the following shortcomings: high construction and maintenance costs, large consumption of non-renewable energy, difficulty in miniaturization of large systems, and difficulty in further improvement of system efficiency.

SUMMARY OF THE INVENTION

The present invention is to provide a paired air pressure energy storage device, which can store two gases with different pressure intensities, has a simple structure, is convenient for transportation and is favorable for effective energy storage and long-term storage of gases.

The present invention is also to provide a method for inspecting the paired air pressure energy storage device, through which the air tightness of the paired air pressure energy storage device can be inspected, and possible leakage during transportation of the paired air pressure energy storage device can be detected conveniently.

The present invention is further to provide a relative pressure gas energy storage system in which the paired air pressure energy storage device can store two gases with different pressure intensities. The relative pressure gas energy storage system has a simple structure, is convenient for transportation and is favorable for effective energy storage and long-term storage of gases.

The present invention is further to provide a balance detection mechanism that can be used to detect the flow difference between two gases with different pressure intensities.

The invention provides a paired air pressure energy storage device, which comprises an inner body and an outer body sleeved outside the inner body, where the inner body is filled with a first gas, a cavity formed between the outer body and the inner body is filled with a second gas, there is a pressure difference between energy of the first gas and energy of the second gas, and the pressure difference is relative pressure gas energy.

The invention also provides a relative pressure gas energy storage system consisting of a plurality of the paired air pressure energy storage devices connected together.

The invention also provides a method for inspecting the paired air pressure energy storage device, which comprises the following steps:

a) connecting a balance detection mechanism to the paired air pressure energy storage device, where the balance detection mechanism is communicated with the inner body of the paired air pressure energy storage device and the cavity of the paired air pressure energy storage device, respectively; and b) detecting a gas flow pressure of the first gas in the inner body and a gas flow pressure of the second gas in the cavity through the balance detection mechanism.

The invention also provides a balance detection mechanism comprising a first pipe and a second pipe, where a rotatable baffle component is arranged between the first pipe and the second pipe, the baffle component is connected with a pointer, the balance detection mechanism further has an indicator disc, and the pointer swings back and forth on the indicator disc according to the rotation of the baffle component.

The invention has the beneficial effects that the paired air pressure energy storage device of the invention adopts a double-body structure of the inner body and the outer body for storing a high-pressure storage gas and a low-pressure storage gas, so that not only the energy storage density between the high-pressure and high-pressure-difference gases is improved, but also the gases can be used as heat of a thermal functional circulation system to flow in the inner body and the cavity between the outer body and the inner body to exchange. In addition, the paired air pressure energy storage device is divided into a plurality of gas storage bodies by a plurality of brake isolation support mechanisms to form a multi-compartment structure, and the gas flow in each gas storage body can pass through a plurality of diversion channels and a plurality of second diversion channels in the brake isolation support mechanisms normally. The braking effect of the brake isolation support mechanism is that the brake isolation support mechanism has little influence on the gas flow since the gas flow rate is relatively slow. When abnormal leakage occurs, the gas flow tends to pass through each of the brake isolation support mechanisms relatively quickly. At this time, the brake isolation support mechanism actively produces a braking effect on the gas flow due to increased kinetic energy of the gas flow received, thus ensuring the safety of storage between high pressure and high pressure difference gases. The supporting function of the brake isolation support mechanism is that when the gas pressure in the paired air pressure energy storage device is increased or the pressure difference between the inner body and the cavity is increased, radial deformation of a body wall (expansion or contraction of the body wall) of the paired air pressure energy storage device is also increased. At this time, the brake isolation support mechanism arranged in a radial direction of the body wall has the effect of inhibiting the deformation, thus improving the pressure bearing capacity of the inner body and the outer body.

BRIEF DESCRIPTION OF THE DRAWINGS

Embodiments of the present invention will be further described below with reference to the accompanying drawings, in which.

DETAILED DESCRIPTION

Hereinafter, the technical solution adopted by the embodiments of the invention will be described clearly and completely with reference to the drawings in the embodiments of the invention. Obviously, the described embodiments are only a part other than all of the embodiments of the present invention. Based on the embodiments of the present invention, all other embodiments obtained by those of ordinary skill in the art without creative work shall fall within the protection scope of the present invention.

As shown in FIGS. 1 to 4, the invention provides a paired air pressure energy storage device 10, which comprises an inner body 1 and an outer body 2 sleeved outside the inner body 1. The inner body 1 is filled with a first gas. The outer body is not in direct contact with the inner body 1, and an annular cavity 21 is formed between the outer body 2 and the inner body 1. The cavity 21 is filled with a second gas. There is a gas energy pressure difference between the first gas and the second gas. The gas energy pressure difference is relative pressure gas energy.

Figure 1:
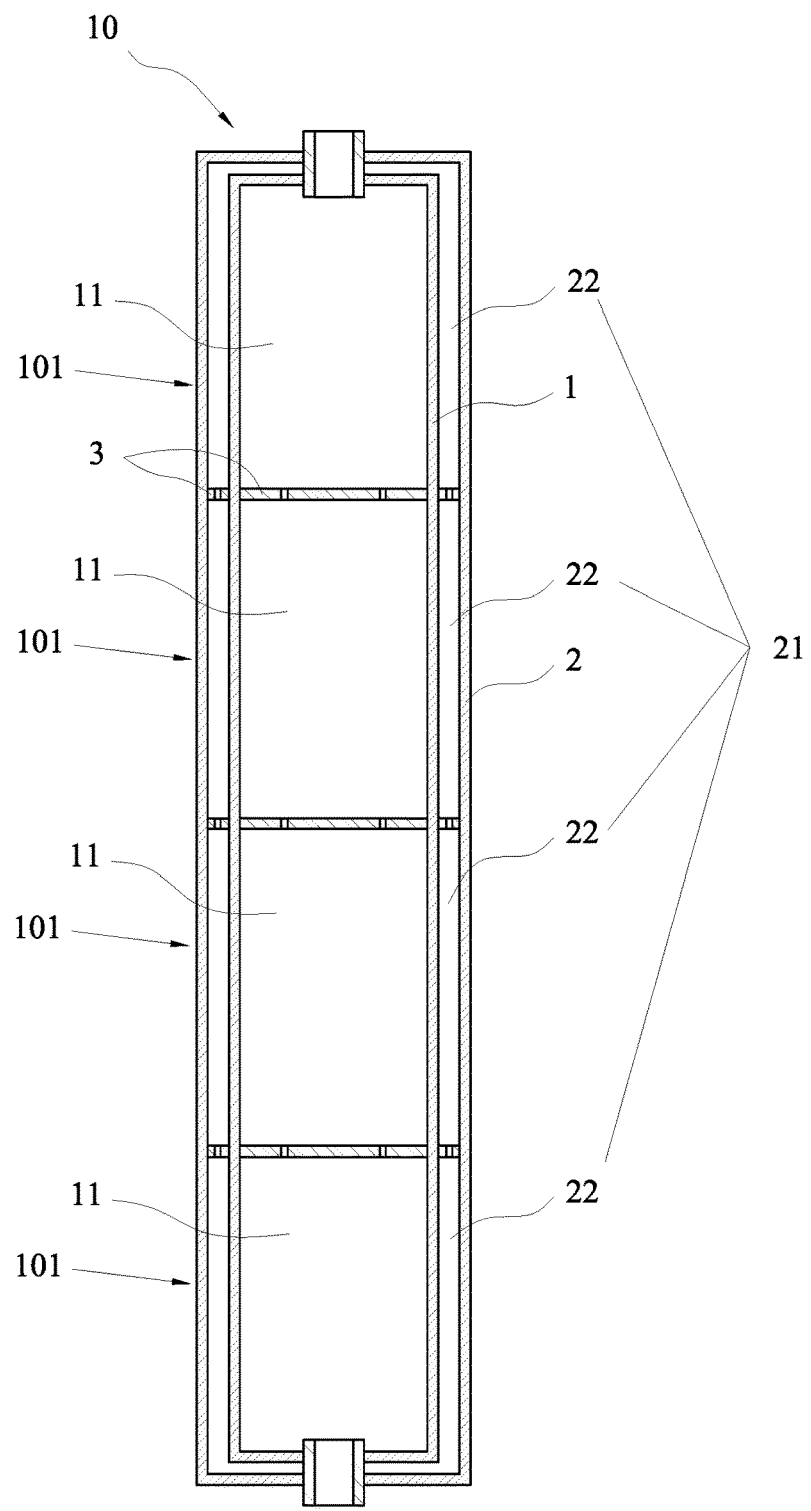
FIGS. 1 to 4 are schematic structural views of an alternative embodiment of the paired air pressure energy storage device of the present invention.
Figure 2:
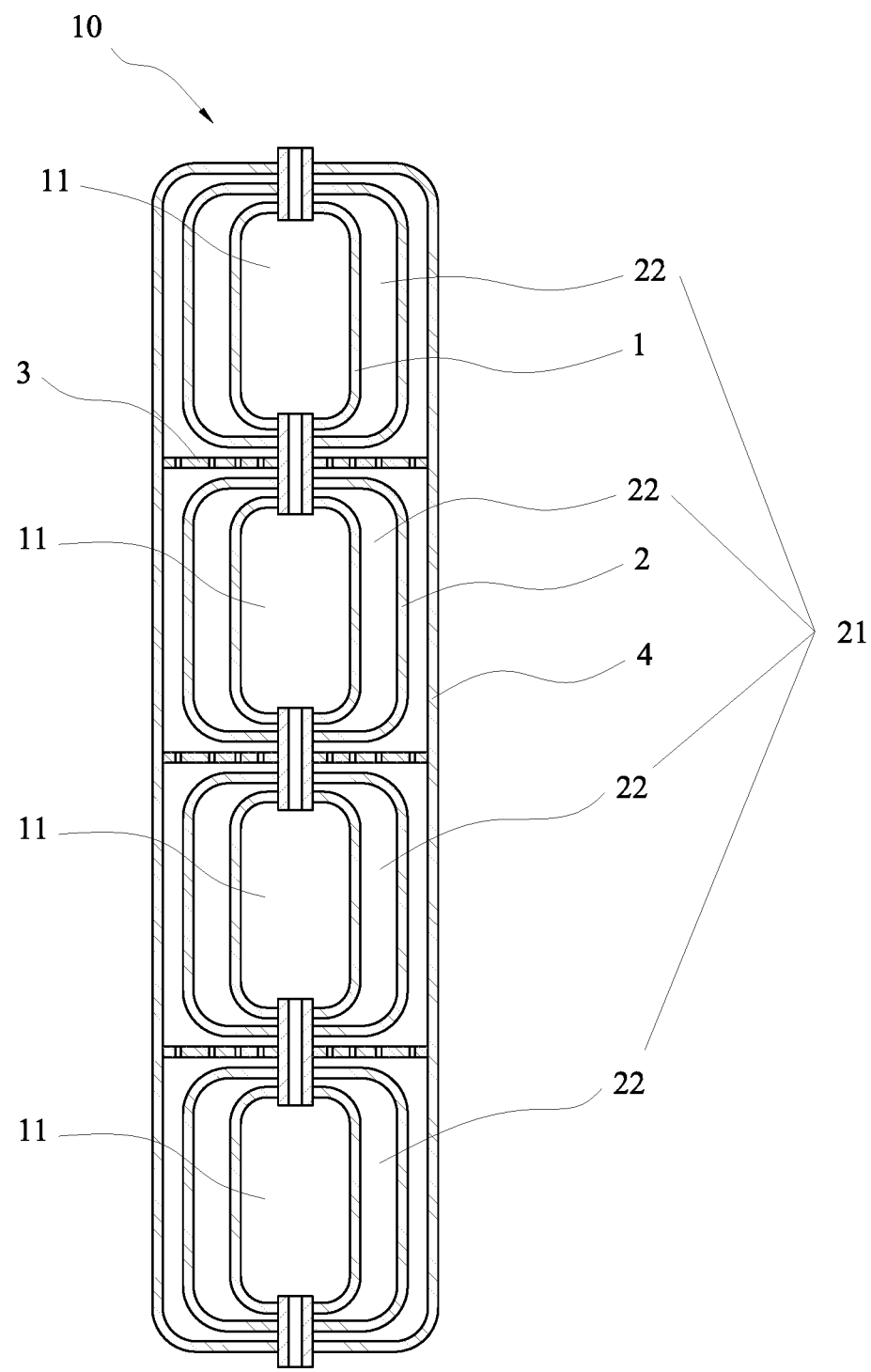
Figure 3:
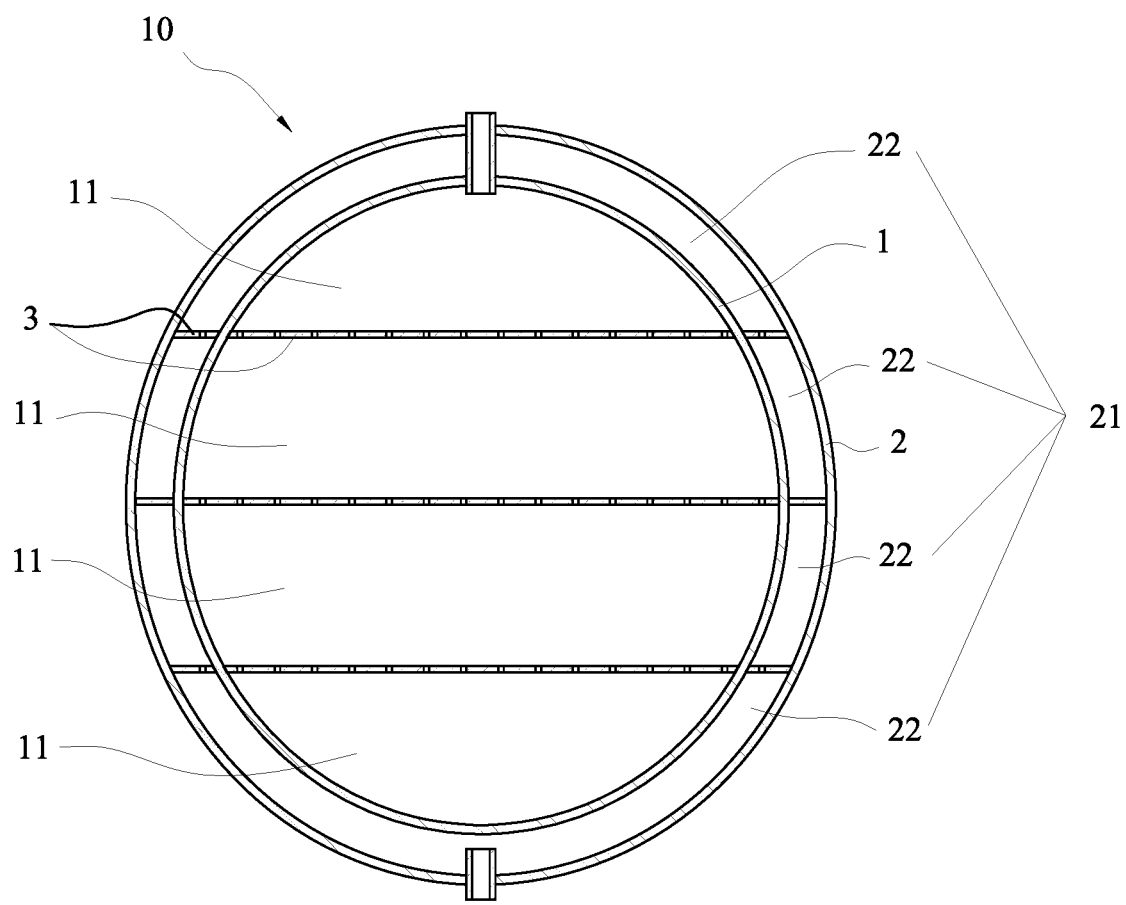
Figure 4:
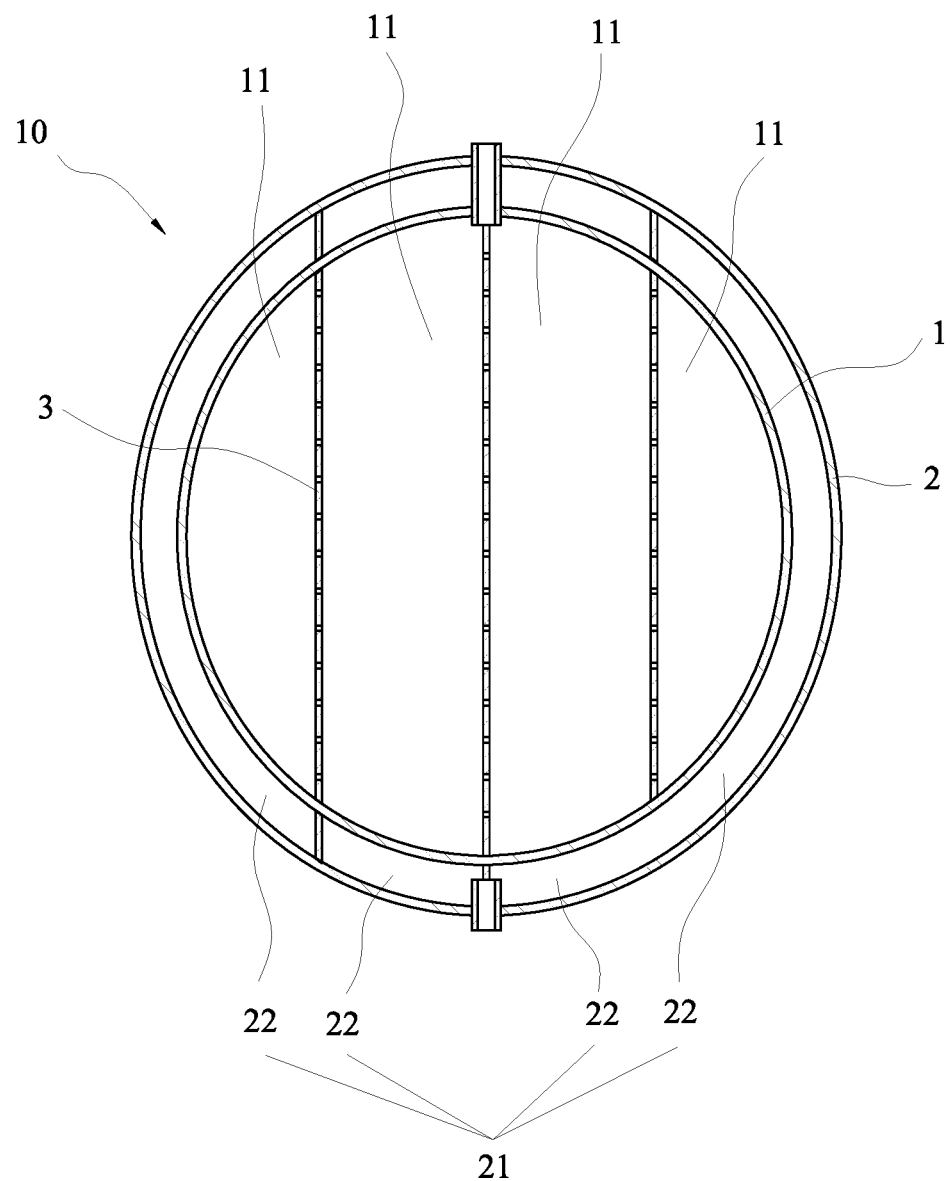

Specifically, in a feasible embodiment, as shown in FIGS. 1 and 2, the inner body 1 may be a long cylindrical structure having a hollow inner cavity filled with the first gas, the outer body 2 is a long cylindrical structure sleeved outside the inner body 1, and the cavity 21 formed between the inner body 1 and the outer body 2 is filled with the second gas. In another feasible embodiment, as shown in FIGS. 3 and 4, the inner body 1 may be a spherical structure having a hollow inner cavity filled with the first gas, the outer body 2 is a spherical structure sleeved outside the inner body 1, and a space formed between the inner body 1 and the outer body 2 is filled with the second gas.

Further, the first gas in the inner body 1 may be a high-pressure storage gas (i.e., a positive pressure storage gas), and the second gas in the cavity 21 formed between the outer body 2 and the inner body 1 may be a low-pressure storage gas (i.e., a negative pressure storage gas), so that there is a pressure difference between the first gas and the second gas, i.e., a gas energy pressure difference is formed between the first gas and the second gas, i.e., relative pressure gas energy. The low-pressure storage gas stored in the cavity 21 may serve as an insulation body of the inner body 1 to protect the high-pressure storage gas stored in the inner body 1. For example, when the storage of relative pressure gas energy is performed on the ground, the first gas in the inner body 1 at this time is provided as the high-pressure storage gas, and the second gas in the cavity 21 formed between the outer body 2 and the inner body 1 is provided as the low-pressure storage gas. A plurality of rigid brake isolation support mechanisms 3 provided between the inner body 1 and the outer body 2 also function as supports for the inner body 1 and the outer body 2 so as to compensate for the pressure difference between a body wall of the inner body 1 and a body wall of the outer body 2, while enhancing the pressure resistance of the body walls of the inner body 1 and the outer body 2.

Alternatively, in another feasible embodiment, the first gas in the inner body 1 is a low pressure storage gas, and the second gas in the cavity 21 formed between the outer body 2 and the inner body 1 is a high pressure storage gas. For example, when storing and/or transporting the relative pressure gas energy under water or underground, since the pressure environment under water or underground is high pressure, the first gas in the inner body 1 at this time is provided as the low pressure storage gas, and the second gas in the cavity 21 formed between the outer body 2 and the inner body 1 is provided as the high pressure storage gas, which is beneficial to relieving the stress on the wall of the outer body 2 and offsetting the contraction pressure of the outer body 2.

In the present invention, a pressure of the high-pressure storage gas is greater than a pressure of the low-pressure storage gas, the pressure of the high-pressure storage gas may be 0.1 MPa to 100 MPa, and the pressure of the low-pressure storage gas may be 100 Pa to 30 MPa.

Further, in the present invention, the first gas and the second gas may be air, nitrogen, helium or a mixture of other gases. The mixture of other gases may be, for example, a mixture of nitrogen and helium, or a mixture of other gases.

With further reference to FIGS. 1 to 4, in an alternative embodiment of the present invention, the paired air pressure energy storage device 10 is internally provided with a plurality of brake isolation support mechanisms 3. The inner body 1 is divided by the plurality of brake isolation support mechanisms 3 to form a plurality of inner isolation compartments 11. The cavity 21 formed between the outer body 2 and the inner body 1 is divided by the plurality of brake isolation support mechanisms 3 to form a plurality of outer isolation compartments 22.

Figure 5:
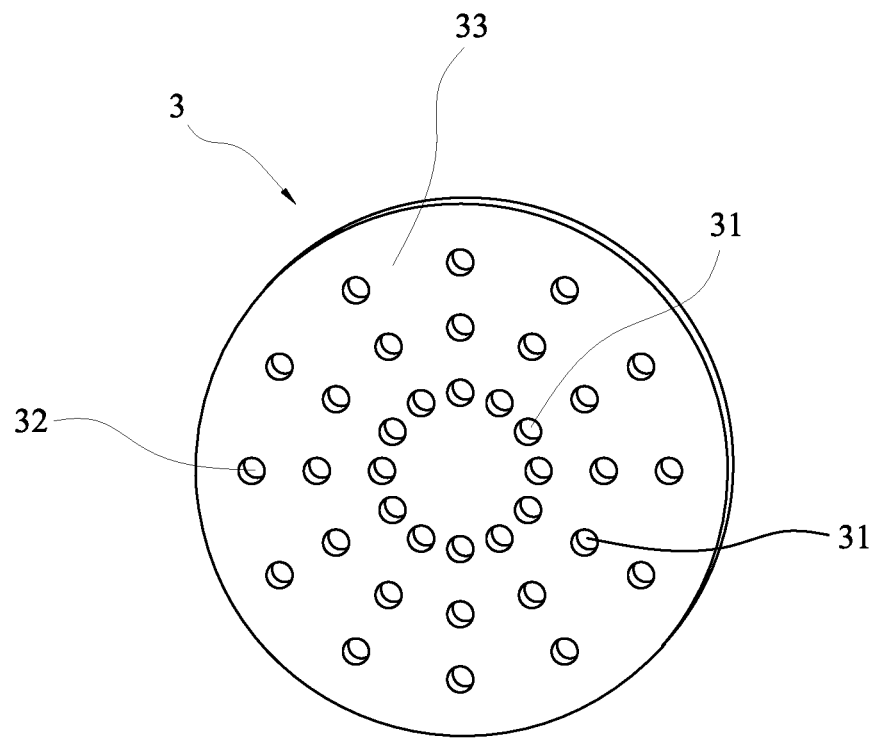
FIG. 5 is a schematic structural view of an alternative embodiment of the brake isolation support mechanism of the present invention.

Specifically, referring to FIG. 5, the brake isolation support mechanisms 3 have a structure that the brake isolation support mechanisms 3 are provided with a plurality of first diversion channels 31 and a plurality of second diversion channels 32. The plurality of outer isolation compartments 22 are communicated with each other through the plurality of second diversion channels 32. The plurality of inner isolation compartments 11 are communicated with each other through the plurality of first diversion channels 31. The setting of the plurality of brake isolation support mechanisms 3 can effectively enhance the structural strength of the paired air pressure energy storage device 10 and improve the safety performance of the gases stored in the paired air pressure energy storage device 10.

Specifically, in a feasible embodiment, as shown in FIG. 5, the brake isolation support mechanism 3 comprises a brake isolation plate 33 made of a rigid material which is steel material or toughened fiber material, etc. The first diversion channels 31 and the second diversion channels 32 are diversion through holes provided in the brake isolation plate 33. The open area of the diversion through holes is about 1% to 10% of the cross-sectional area of the brake isolation plate 33. In a specific example, the brake isolation plate 33 is generally disc-shaped. Of course, in other embodiments, the brake isolation plate 33 may be polygonal or other shapes, and there is no limitation thereto. The thickness of the brake isolation plate 33 is about one to ten times that of the inner body 1 or the outer body 2.

In this embodiment, a plurality of concentric diversion through hole groups are arranged in the disc-shaped brake isolation plate 33 from the inside to the outside, where the second diversion channels 32 is arranged at an outermost layer located at an outer edge of the brake isolation plate 33, and the first diversion channels 31 are arranged at an innermost layer near the center of the disc and at an intermediate layer between the innermost layer and the outermost layer.

In an embodiment, the brake isolation plate 33 can be fixedly connected to an inner wall of the outer body 2 by way of welding connection, so as to divide the paired air pressure energy storage device 10 into a plurality of storage bodies 101 communicating with each other. In the present invention, when a rapid leakage occurs in a certain storage body 101 of the paired air pressure energy storage device 10, the diversion through holes 311 will show greater gas flow resistance and reduce the bursting degree of the paired air pressure energy storage device 10. However, in the normal process of gas storage or gas release, the diversion through holes 311 will show less resistance to the gas flow, thus realizing the mutual communication of gas between the plurality of storage bodies 101 of the paired air pressure energy storage device 10.

Figure 6:
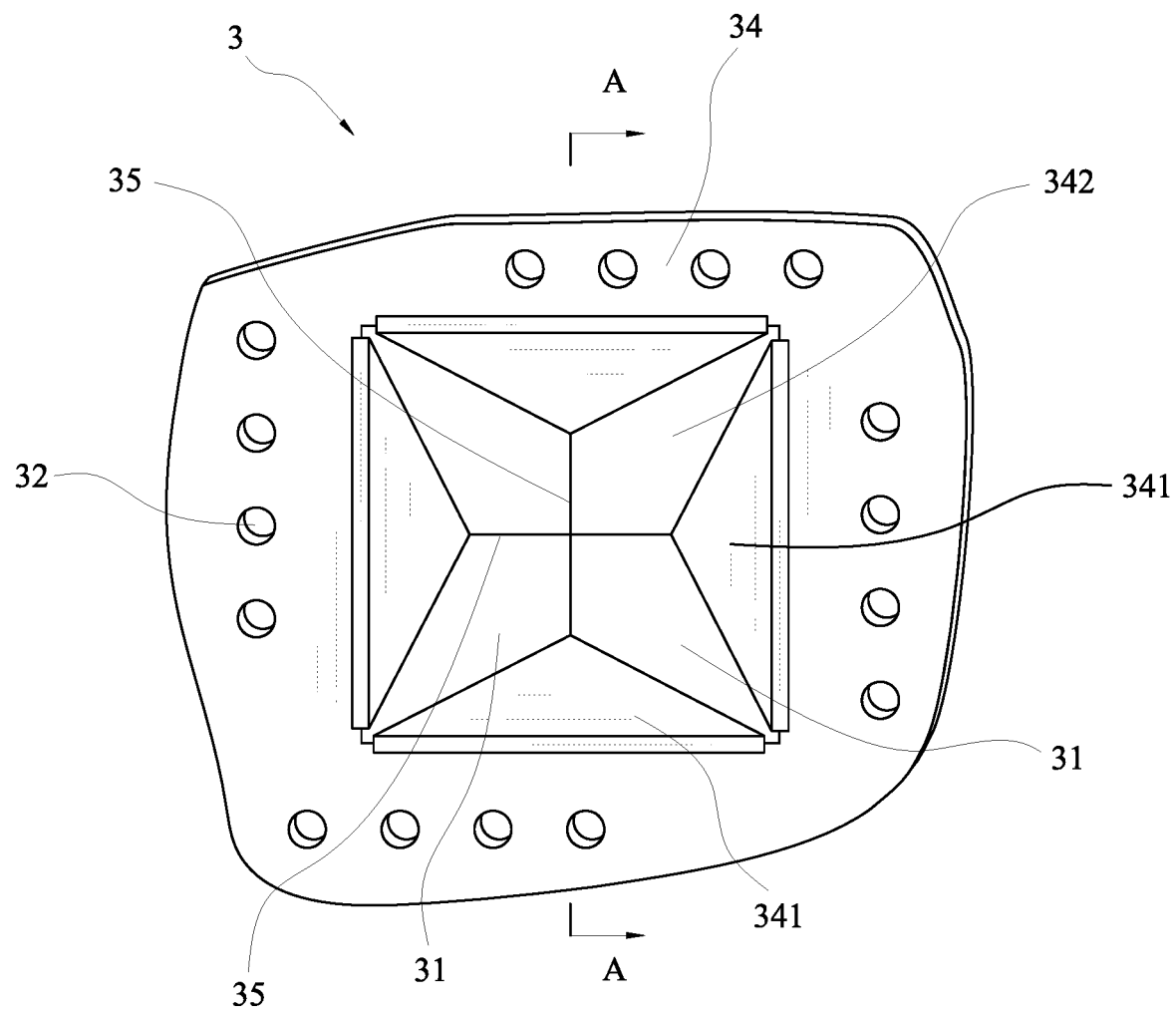
FIGS. 6 to 7 are top and side views of an alternative embodiment of the brake isolation support mechanism of the present invention.
Figure 7:
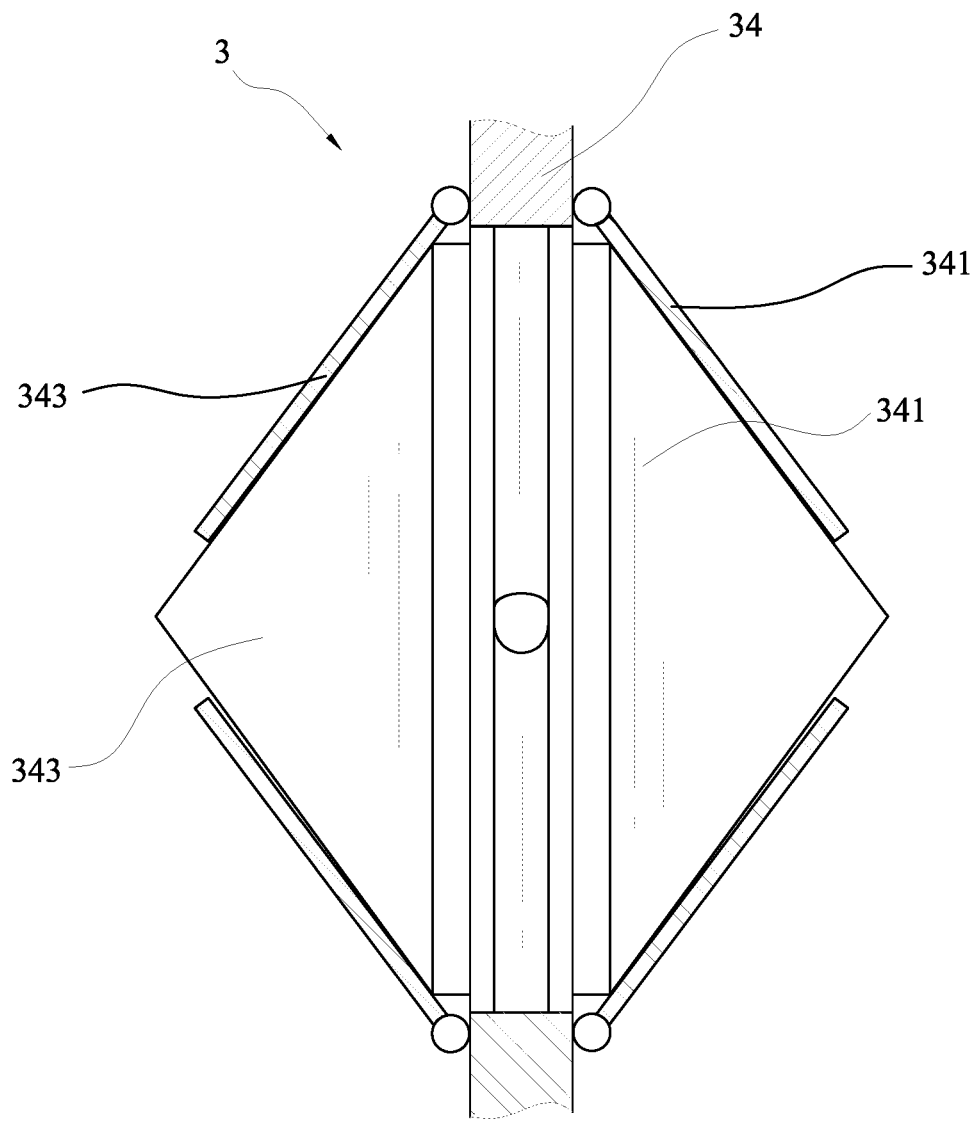

In another feasible embodiment, as shown in FIGS. 6 and 7, the brake isolation support mechanism 3 comprises a brake isolation plate 34 and a plurality of first barrier plates 341 that are openably and closably connected to one side of the brake isolation plate 34. The brake isolation plate 34 is made of a rigid material which is steel material or toughened fiber material.

In this embodiment, the plurality of first diversion channels 31 are located in the plurality of first barrier plates 341. In a closed state of the plurality of first barrier plates 341, the plurality of first diversion channels 31 are also closed. The second diversion channels 32 are provided in the brake isolation plate 34 which are also diversion through holes, and the open area of the diversion through holes is about 1% to 10% of the cross-sectional area of the brake isolation plate 34 where they are located. In a specific example, the brake isolation plate 34 is generally disc-shaped. Of course, in other embodiments, the brake isolation plate 34 may be polygonal or other shapes, and there is no limitation thereto. The thickness of the brake isolation plate 34 is about one to ten times that of the inner body 1 or the outer body 2.

In this embodiment, a square opening 342 is formed in the middle of the brake isolation plate 34. In the opening 342, two connecting rods 35 vertically intersecting are arranged to form a cross structure, thereby dividing the opening 342 into four hollow areas which constitute four first diversion channels 31. The cross structure constituted by the two vertically intersecting connecting rods 35 serves, on the one hand, the purpose of supporting the structural strength of the brake isolation plate 34, and on the other hand, reduces the bursting strength when the paired air pressure energy storage device 10 is ruptured. Four first barrier plates 341 are provided, each of which has a right-angled triangular shape, and four right angles of the four first barrier plates 341 are abuttingly joined and spliced to form a complete square, so as to cover the square opening 342. One side of the first barrier plate 341 opposite to its right angle is rotatably connected, for example, by means of pivotal connection. Of course, in other embodiments, the middle portion of the brake isolation plate 34 may be provided with an opening 342 of other shapes, at this time, the first barrier plate 341 may be provided with other shapes, as long as it is ensured that the plurality of first barrier plates 341 can sealingly shield the opening 342 after being spliced together, and there is no limitation thereto.

Further, referring to FIG. 7, a plurality of second barrier plates 343 may also be openably and closably connected to the other side of the brake isolation plate 34 away from the first barrier plates 341. In a closed state of the plurality of second barrier plates 343, the plurality of second barrier plates 343 close the plurality of first diversion channels 31. The structure and number of the second barrier plate 343, connection manner with the brake isolation plate 34, and the technical effect achieved are the same as those of the first barrier plate 341, and thus will not be described in detail here.

When the paired air pressure energy storage device 10 is in a normal process of gas storage or gas release, the first barrier plates 341 and the second barrier plates 342 of the brake isolation plate 34 of the present invention are in an open state. However, when a certain storage body 101 of the paired air pressure energy storage device 10 is rapidly deflated, the plurality of first barrier plates 341 and the plurality of second barrier plates 342 located on both sides of the brake isolation plate 34 will be pressed by the gas flow and adaptively tends to rotate toward a state where the plurality of first diversion through holes 31 are closed, thus achieving the purpose of slowing down the flow speed of the gas flow in the inner body 1 and preventing the rapid bursting of the paired air pressure energy storage device 10.

In a possible embodiment of the present invention, as shown in FIG. 2, a protective body 4 is sleeved outside the outer body 2. Specifically, the protective body 4 may be made of a burst-resistant material, such as a hard toughened fiber material or a flexible bulletproof fiber material, etc. The protective body 4 may be a long cylindrical structure and is covered on the outside of the outer body 2 of the long cylindrical structure, so as to protect the paired air pressure energy storage devices 10 during transportation and prevent damage to the paired air pressure energy storage devices 10 during transportation or standing. The protective body 4 is wrapped around the inner body 1 and the outer body 2, thus further strengthening and improving the safety of the gas stored in the paired air pressure energy storage device 10.

The paired air pressure energy storage device 10 with the structure shown in FIGS. 1 to 4 is especially suitable for storage of relative pressure gas energy in small or moving places. Due to the requirements of volume, transportation and safety, the storage tank, column, cylinder or sphere in a double-body composite form of the inner body 1 and the outer body 2 is used as a gas energy storage body, which is particularly suitable for a double-body composite storage structure made of resin fiber or carbonized glass. The inner body 1 of the paired air pressure energy storage device 10 stores high-pressure storage gas and the outer body 2 thereof stores low-pressure storage gas. In this embodiment, the inner body 1 is made of a thermally conductive reinforcing material, which is beneficial to the convection of complementary heat generated between the inner body 1 and the cavity 21 when the first gas in the inner body 1 and the second gas in the cavity 21 formed between the outer body 2 and the inner body 1 are simultaneously expanded and compressed, thus improving the energy storage efficiency of the system. The outer body 2 is made of a non-thermally conductive reinforcing material, which is beneficial to preserving the heat of the system, thereby further improving the energy storage efficiency of the system.

Figure 8:
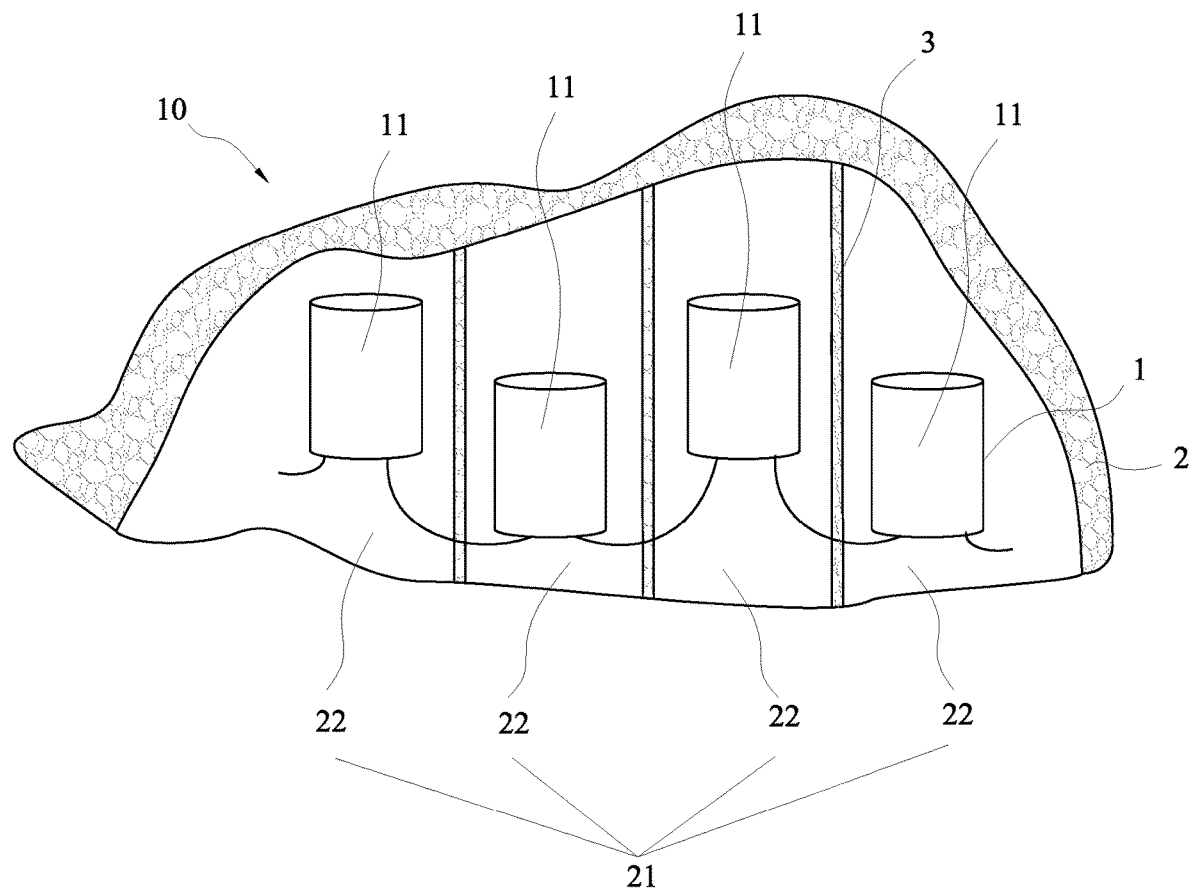
FIG. 8 is a schematic structural view of another alternative embodiment of the paired air pressure energy storage device of the present invention.

In a possible embodiment of the present invention, as shown in FIG. 8, the outer body 2 may be a natural cave or an artificial mine channel, and the inner body 1 may be a plurality of tank or spheres connected in series, where the first gas in the tanks or spheres is a low-pressure storage gas, and the second gas in the natural cave or the artificial mine channel is a high-pressure storage gas, which is beneficial to offset the contraction pressure of natural bodies such as the natural cave or artificial mine channel. According to the invention, large natural caves, large artificial mine channels, cave walls, well walls and the like can be selected as large-capacity storage reservoirs, so that large-scale industrial-level relative pressure gas energy storage can be realized, and the construction cost can be saved. In this embodiment, the inner body 1 is made of a thermally conductive reinforcing material, which is beneficial to the convection of complementary heat generated between the inner body 1 and the cavity 21 when the first gas in the inner body 1 and the second gas in the cavity 21 formed between the outer body 2 and the inner body 1 are simultaneously expanded and compressed, thus improving the energy storage efficiency of the system.

According to an embodiment of the present invention, the paired air pressure energy storage device 10 is connected with a balance detection mechanism 5 for detecting the gas flow pressure of the first gas and the gas flow pressure of the second gas, and the balance detection mechanism 5 is communicated with the inner body 1 of the paired air pressure energy storage device 10 and the cavity 21 of the paired air pressure energy storage device 10, respectively. The balance detection mechanism 5 may also be used to identify leakage of the first gas and the second gas in the paired air pressure energy storage device 10.

Figure 9:
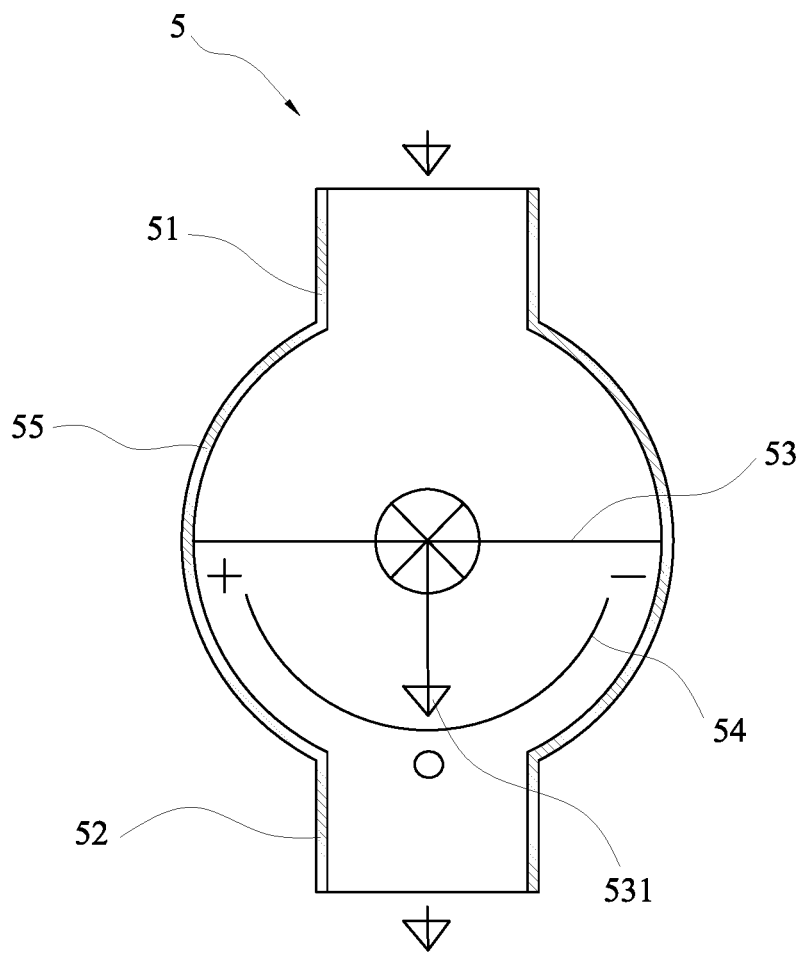
FIGS. 9 to 11 are schematic structural views of alternative embodiments of the balance detection mechanism of the present invention.

Specifically, referring to FIG. 9, the balance detection mechanism 5 comprises a first pipe 51 communicating with the inner body 1 and a second pipe 52 communicating with the cavity 21. A rotatable baffle component 53 is arranged between the first pipe 51 and the second pipe 52. The baffle component 53 is connected with a pointer 531. The balance detection mechanism 5 further includes an indicator disc 54. The pointer 531 swings back and forth on the indicator disc 54 according to the rotation of the baffle component 53.

Figure 10:
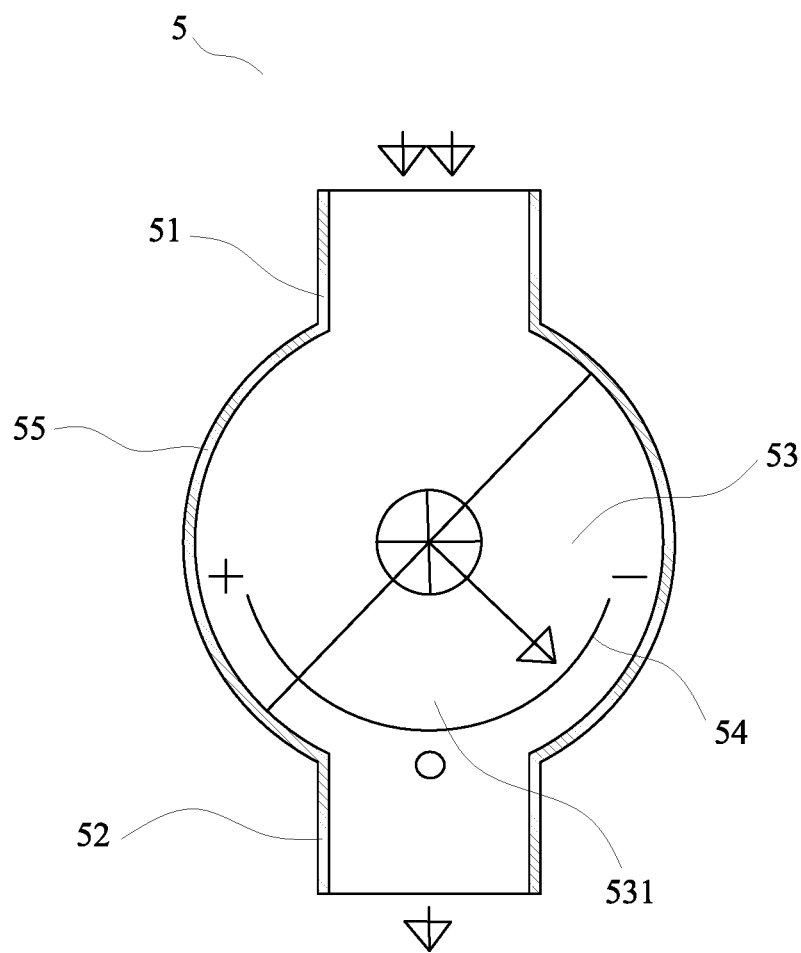
Figure 11:
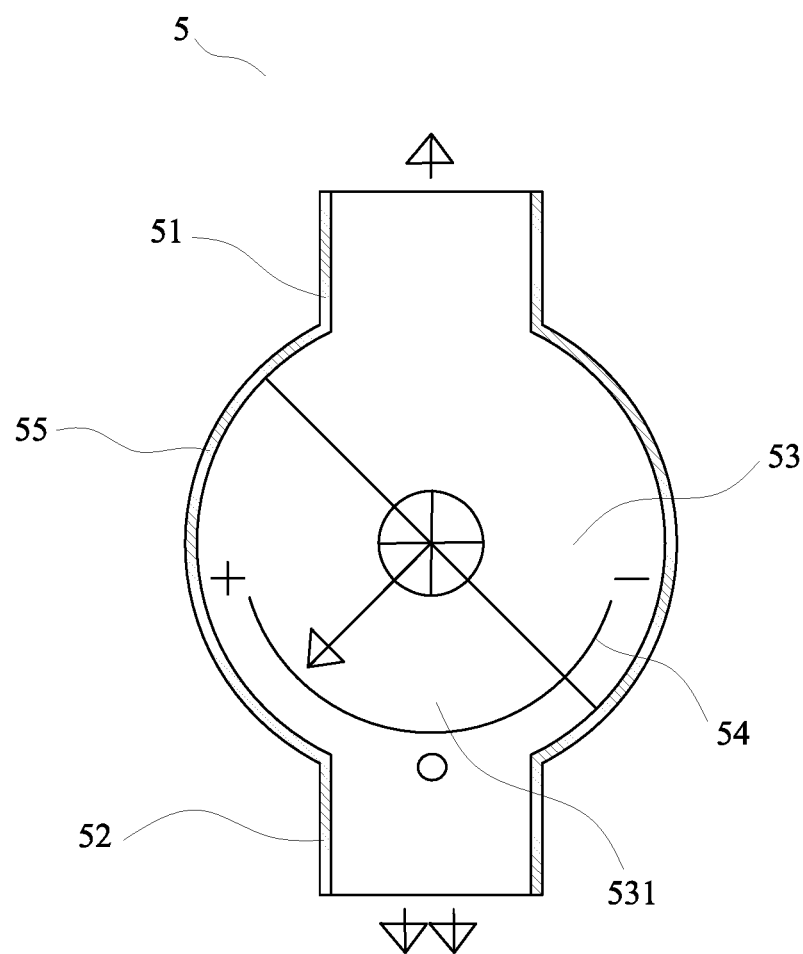

In a possible embodiment of the present invention, as shown in FIGS. 9 to 11, the first pipe 51 and the second pipe 52 are communicated with each other through a detection housing 55. The baffle component 53 is a baffle plate which is rotatably and sealingly arranged in the detection housing 55. The pointer 531 is connected with the baffle plate. The pointer 531 is located outside the detection housing 55. The indicator disc 54 is arranged on an outer wall of the detection housing 55.

The detection housing 55 may be a circular housing having a middle portion rotatably connected with the baffle plate. The first pipe 51 communicating with the first gas is located at one side of the baffle plate, and the second pipe 52 communicating with the second gas is located at the other side of the baffle plate. When a gas pressure in the first pipe 51 is greater than a gas pressure in the second pipe 52, as shown in FIG. 10, the baffle component 53 rotates clockwise in the detection housing 55 to drive the pointer 531 to rotate, so as to indicate a corresponding coordinate on the indicator disc 54, showing the pressure difference in the first pipe 51 and the second pipe 52. When the gas pressure in the first pipe 51 is less than the gas pressure in the second pipe 52, as shown in FIG. 11, the baffle component 53 rotates counterclockwise in the detection housing 55 to drive the pointer 531 to rotate, and a corresponding coordinate indicated on the indicator disc 54 by the pointer 531 is the pressure difference between the gas in the first pipe 51 and the gas in the second pipe 52.

Figure 12:
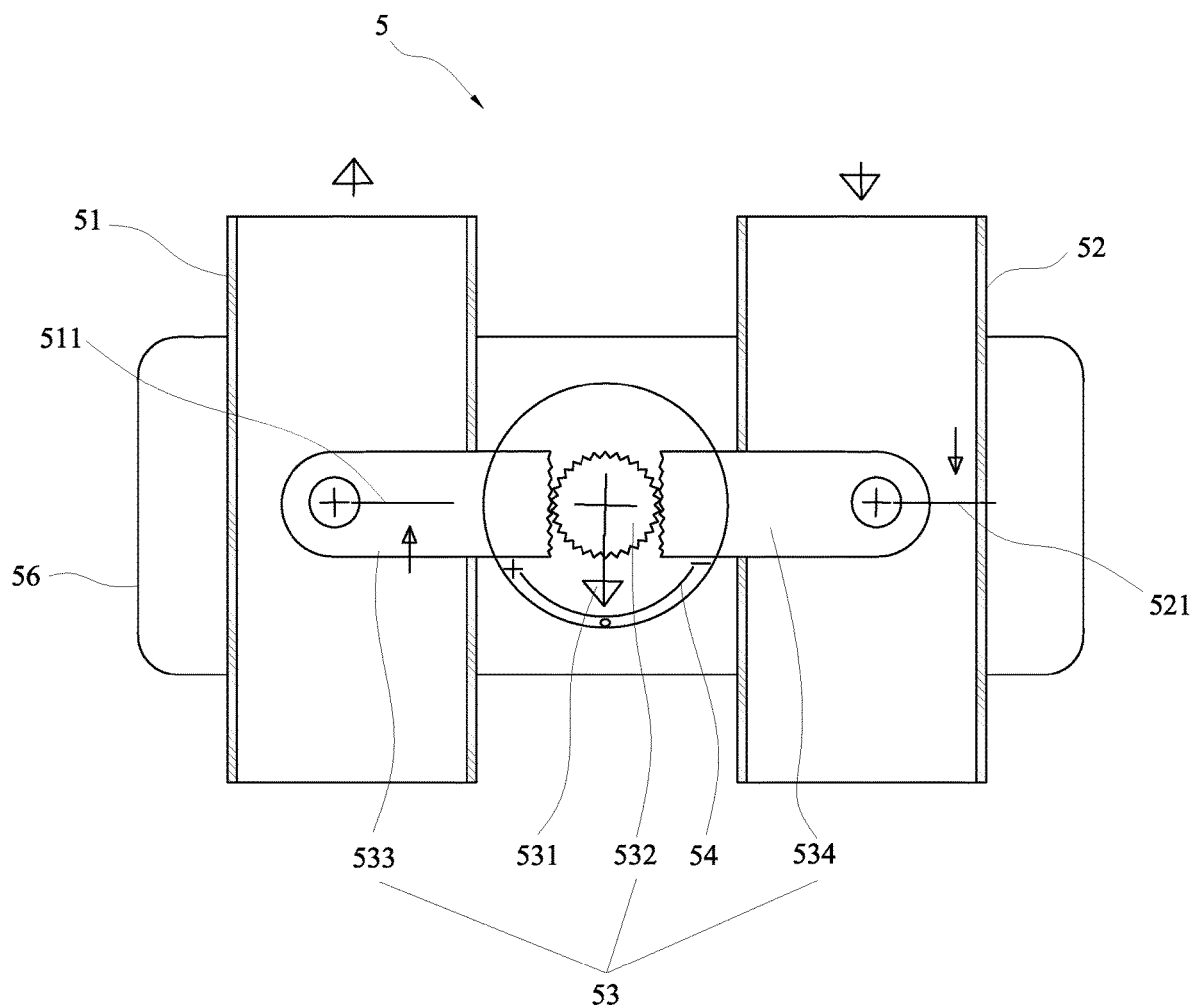
FIGS. 12 to 14 are schematic structural views of another alternative embodiment of the balance detection mechanism of the present invention.
Figure 13:
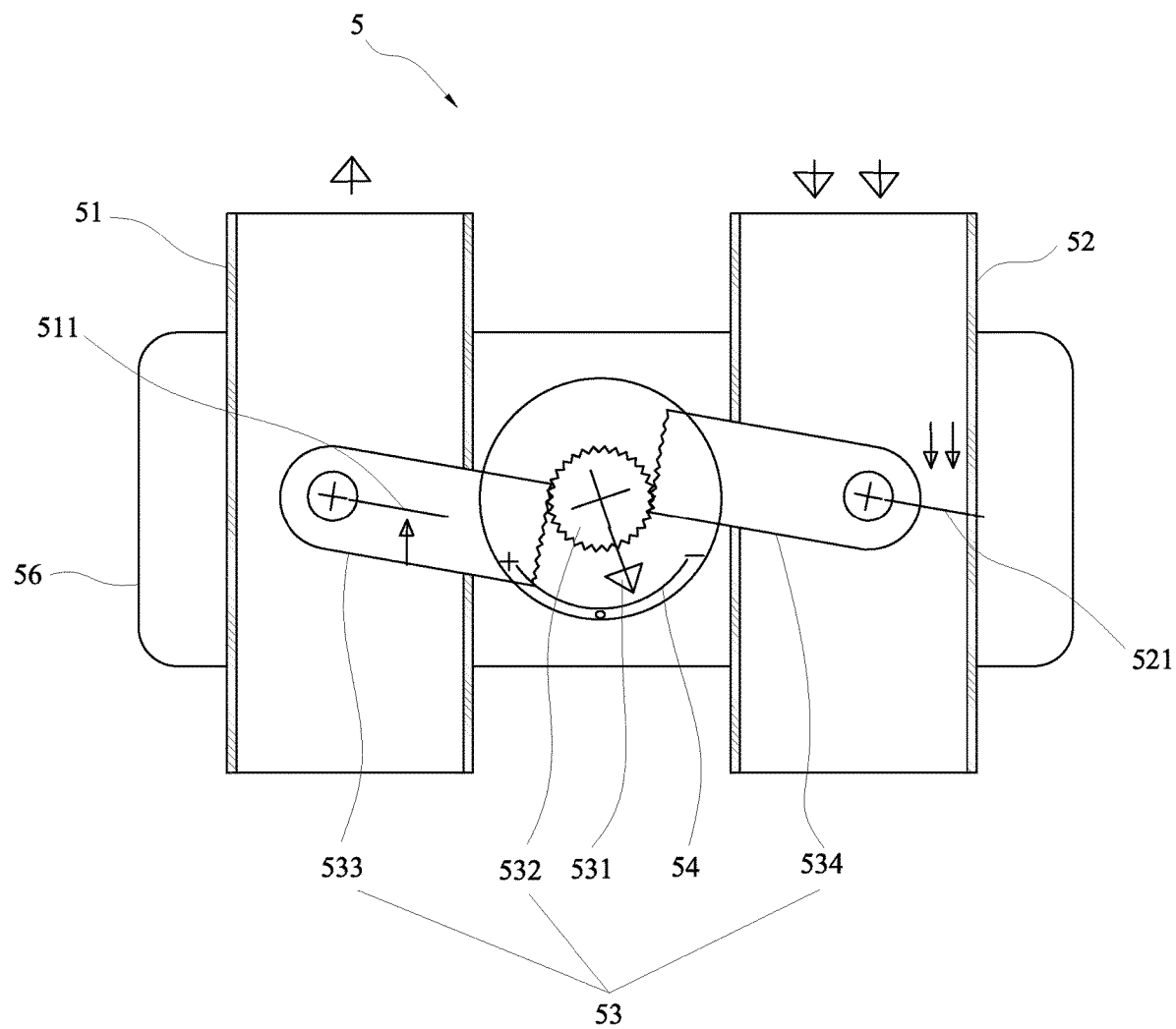
Figure 14:
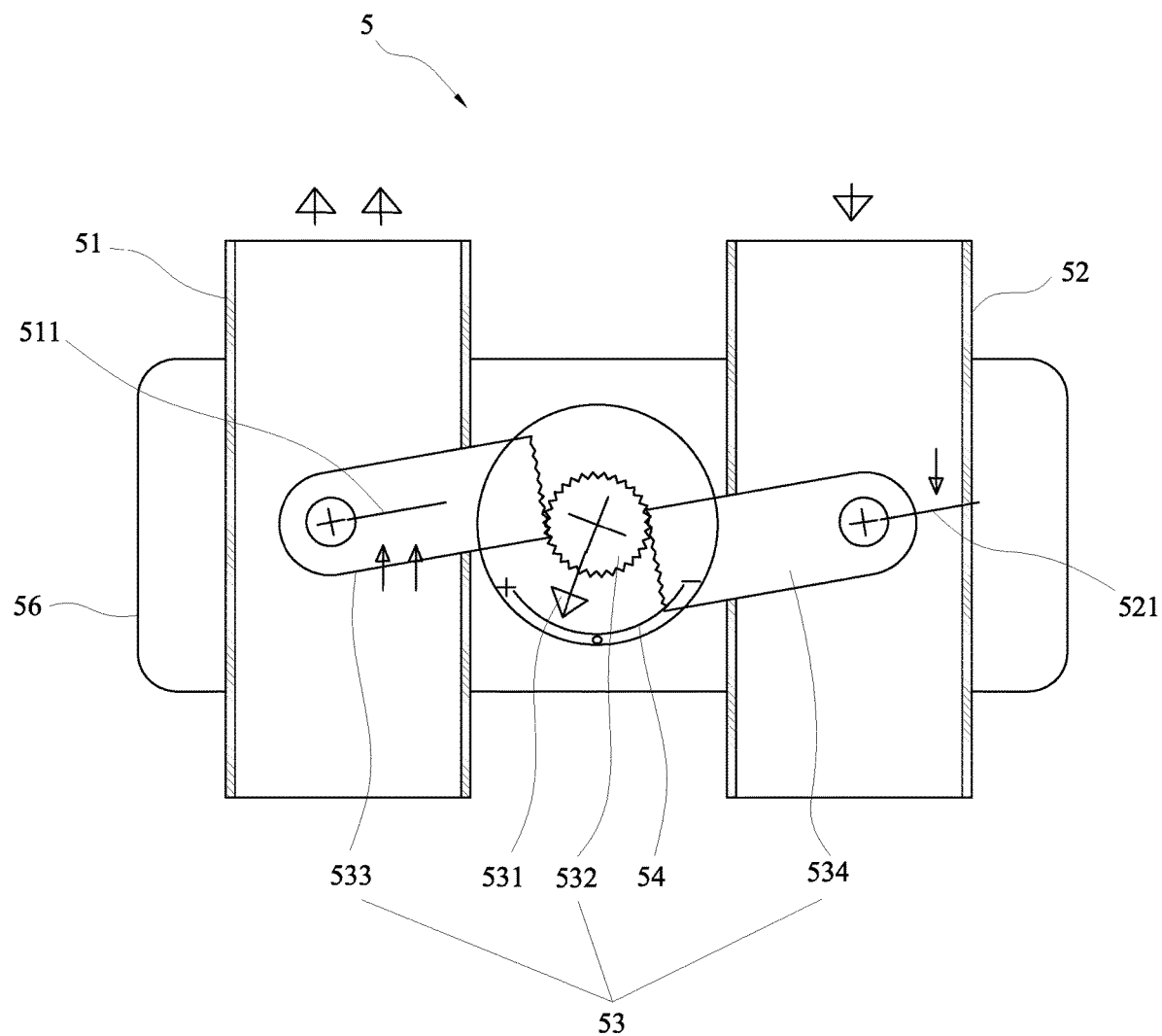

In another possible embodiment of the present invention, as shown in FIGS. 12 to 14, the first pipe 51 and the second pipe 52 of the balance detection mechanism 5 are arranged side by side. Baffle vanes 511 are provided in the first pipe 51, and baffle vanes 521 are provided in the second pipe 52. The baffle component 53 comprises a center wheel 532. A first connecting rod 533 and a second connecting rod 534 are drivingly connected to two sides of the center wheel 532, respectively. The first connecting rod 533 is connected with the baffle vanes 511 in the first pipe 51. The second connecting rod 534 is connected with the baffle vanes 521 in the second pipe 52. The pointer 531 is connected to the center wheel 54 and rotates with the rotation of the center wheel 54. The indicator disc 54 is located between the first pipe 51 and the second pipe 52.

Specifically, the balance detection mechanism 5 in this embodiment has a bracket 56, and a middle portion of the bracket 56 is rotatably connected with a center wheel 532 which is a cylindrical gear structure. The first pipe 51 and the second pipe 52 are respectively located on both sides of the bracket 56, i.e., on both sides of the center wheel 532. In this embodiment, the baffle vanes 511 in the first pipe 51 are drivingly connected with the center wheel 532 through the first connecting rod 533. One end of the first connecting rod 533 connected with the center wheel 532 is provided with a sawtooth structure so as to form a gear meshing structure with the center wheel 532. The baffle vanes 521 in the second pipe 52 are drivingly connected with the center wheel 532 through the second connecting rod 534. One end of the second connecting rod 534 connected with the center wheel 532 is provided with a sawtooth structure so as to form a gear meshing structure with the center wheel 532.

In this embodiment, the baffle vanes 511 in the first pipe 51 are arranged coaxially and coincident with the first connecting rod 533, and the baffle vanes 521 in the second pipe 52 are arranged coaxially with and opposite to the second connecting rod 534 so as to reflect the degree of difference between the gas flow rates in the first pipe 51 and the second pipe 52 through the indicator disc 54.

In this embodiment, the baffle vanes 511 and 521 may be circular, square or polygonal vanes. The baffle vanes 511 and 521 are used to sense a thrust force of the gas flow flowing through the first pipe 51 and the second pipe 52. As shown in FIG. 12, when the flow rates of the gas flow in the first pipe 51 and the second pipe 52 are equal, the thrust forces of the gas flow sensed by the baffle vanes 511 and 521 are equal, and the pointer 531 points to a position indicating a center zero point or a balance zero point of the indicator disk 54. As shown in FIG. 13, when the pressure of the gas flow in the second pipe 52 is greater than the pressure of the gas flow in the first pipe 51, the gas flow thrust force sensed by the baffle vanes 521 in the second pipe 52 is greater than that sensed by the baffle vanes 511 in the first pipe 51. At this time, the second connecting rod 534 obtains a greater rotational torque than the first connecting rod 533, thus the center wheel 532 and the pointer 531 thereon are moved away from the position of the center zero point of the indicator disc 54 in a direction of the second pipe 52, indicating an unbalanced gas flow source and the degree of imbalance. As shown in FIG. 14, when the pressure of the gas flow in the first pipe 51 is greater than the pressure of the gas flow in the second pipe 52, the gas flow fluid thrust sensed by the baffle vanes 511 in the first pipe 51 is greater than the gas flow fluid thrust sensed by the baffle vanes 521 in the second pipe 52, then the rotational torque obtained by the first connecting rod 533 is greater than the rotational torque obtained by the second connecting rod 534, thus the center wheel 532 and the pointer 531 thereon are moved away from the position of the center zero point of the indicator disc 54 in a direction of the first pipe 51, indicating an unbalanced gas flow source and the degree of imbalance.

The paired air pressure energy storage device 10 of the invention adopts the double-body structure of the inner body 1 and the outer body 2 for storing the high-pressure storage gas and the low-pressure storage gas, so that not only the energy storage density between the high-pressure and high-pressure-difference gases is improved, but also the gases can be used as heat of a thermal functional circulation system to flow in the inner body 1 and the cavity 21 between the outer body 1 and the inner body 2, and exchange. In addition, the paired air pressure energy storage device 10 is divided into a plurality of gas storage bodies 101 by the plurality of brake isolation support mechanisms 3 to form a multi-compartment structure, and the gas flow in each gas storage body 101 can pass through a plurality of diversion channels 31 and a plurality of second diversion channels 32 in the brake isolation support mechanisms 3 normally. The braking principle of the brake isolation support mechanism 3 is that the brake isolation support mechanism 3 has little influence on the gas flow since the gas flow rate is relatively slow. When abnormal leakage occurs, the gas flow tends to pass through each of the brake isolation support mechanisms 3 relatively quickly. At this time, the brake isolation support mechanism 3 actively produces a braking effect on the gas flow due to increased kinetic energy of the gas flow received, thus ensuring the safety of storage between high pressure and high pressure difference gases. The supporting function of the brake isolation support mechanism 3 is that when the gas pressure in the paired air pressure energy storage device 10 is increased or the pressure difference between the inner body 1 and the cavity 21 is increased, radial deformation of a body wall of the paired air pressure energy storage device 10 is also increased. The radial deformation of a body wall comprises expansion or contraction of the body wall. At this time, the brake isolation support mechanism 3 arranged in a radial direction of the body wall has the effect of inhibiting the deformation, thus improving the pressure bearing capacity of the inner body 1 and the outer body 2.

Gas source mediums of the relative pressure gas energy stored in the paired air pressure energy storage device 10 of the invention come from the respective closed inner body 1 and outer body 2. The gas source mediums hardly exchange with outside environment mediums, and thus are unaffected by the external environmental medium. The thermodynamic operating process of the relative pressure gas energy stored in the paired air pressure energy storage device 10 is an isothermal and isovolumetric exchange process of heat, work and energy. A temperature rise associated with the "gas compression" during a formation process of gas source injection into the paired air pressure energy storage device 10 and a temperature drop associated with the "gas suction" during a process of gas source outputting from the paired air pressure energy storage device 10 are complementary to each other and the total discharge is nearly zero.

Gas source power of the relative pressure gas energy stored in the paired air pressure energy storage device 10 allows a compressor and a vacuum machine to do work isothermally and isovolumetrically, thereby creating a high pressure difference between the high-pressure storage gas and the low-pressure storage gas of the relative pressure gas storage device 10 and storing it as high-pressure normal-temperature gas energy. Since a large amount of heat generated by the compression process is equal in quantity and timing to the amount of cold required by the expansion process, the heat and cold can be compensated by contacting the body wall of the inner body 1, without having to store additional heat or cold energy, thus the efficiency of the system can also be improved remarkably. The gas energy in the relative pressure energy storage device 10 can be applied to a generator or a pneumatic machine to do work by an expander and the compressor. The large amount of cold required during the expansion of the high-pressure storage gas is equal in quantity and timing to the amount of heat generated during the compression of the low pressure storage gas, such that the heat and cold can be compensated by contacting the body wall of the inner body 1, thus eliminating the need for supplement of additional heat energy, cold energy or non-renewable energy, the operation efficiency of the energy storage system for external work can be further improved, and the investment and maintenance costs of the system are also reduced.

Figure 15:
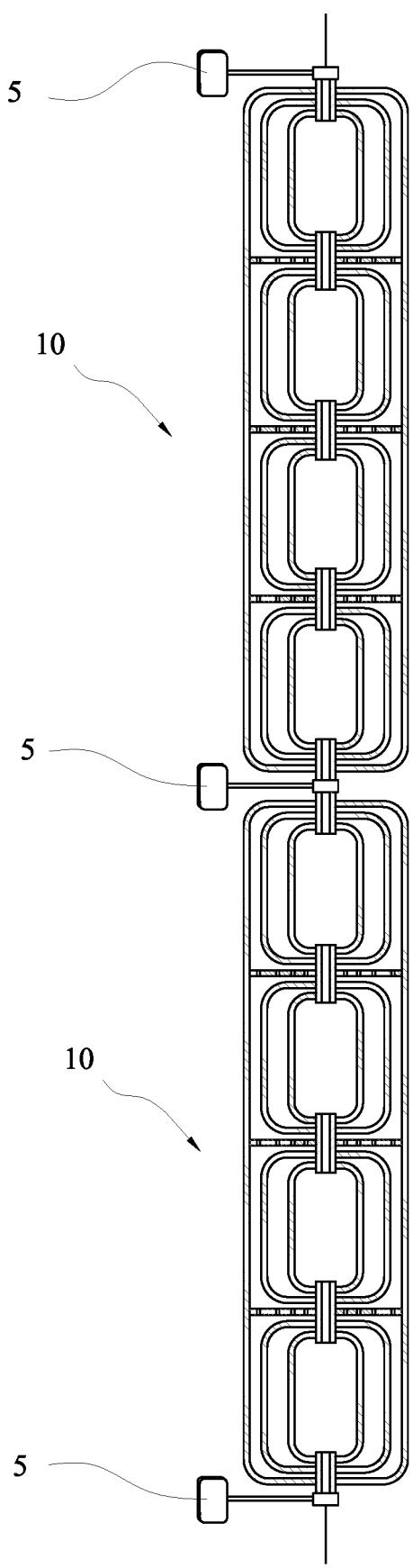
FIG. 15 is a schematic structural view of the relative pressure gas energy storage system of the present invention.

As shown in FIG. 15, the present invention also provides a relative pressure gas energy storage system consisting of a plurality of the above paired air pressure energy storage devices 10 connected together. The specific structure, operation process and beneficial effects of the paired air pressure energy storage device 10 have been described in detail with respect to the above-mentioned paired air pressure energy storage device 10, and will not be described again here.

The invention also provides an inspection method for a paired air pressure energy storage device, which comprises the following steps:

a) connecting a balance detection mechanism 5 to the paired air pressure energy storage device 10, wherein the balance detection mechanism is communicated with an inner body 1 of the paired air pressure energy storage device and a cavity 21 of the paired air pressure energy storage device 10, respectively; and b) detecting a gas flow pressure of the first gas in the inner body 1 and a gas flow pressure of the second gas in the cavity 21 through the balance detection mechanism 5.

The specific process and beneficial effects of the inspection method have been described in detail with respect to the above-mentioned paired air pressure energy storage device 10, and will not be described again here.

The invention also provides a balance detection mechanism 5, as shown in FIGS. 9 to 15. The specific structure, operation process and beneficial effects of the balance detection mechanism 5 have been described in detail with respect to the above-mentioned paired air pressure energy storage device 10, and will not be described again here.

The balance detection mechanism 5 realizes the detection of pressure difference of the relative pressure gas energy and the detection of flow difference of the relative pressure gas flow by utilizing the characteristic of double pressure symbiosis of the relative pressure gas energy. Thus, the observability and maintainability of high-pressure and high-pressure-difference gas during storage and transportation is improved. It is convenient to identify leakage of the gas working medium and locate the leakage place. Moreover, it is beneficial to strengthening the transportation, storage and management capability of the relative pressure gas energy and improving the quality of the gas sources.

Finally, the above examples are only used to illustrate the technical scheme of the present invention and are not intended to limit it. Although the present invention has been described in detail with reference to the preferred embodiment, it should be understood by those skilled in the art that modifications or equivalent substitutions may be made to the technical scheme of the present invention without departing from the spirit and scope of the technical scheme of the present invention, and which should all be included in the scope of the claims of the present invention.

What is claimed is:

1. A paired air pressure energy storage device, comprising an inner body and an outer body sleeved outside the inner body; wherein the inner body is filled with a first gas; the outer body is not in direct contact with the inner body; an annular cavity is formed between the outer body and the inner body; the cavity is filled with a second gas; a gas energy pressure difference exists between the first gas and the second gas; and the gas energy pressure difference is a relative pressure difference; and the paired air pressure energy storage device is internally provided with a plurality of brake isolation support mechanisms; the inner body is divided into a plurality of inner compartments by the plurality of brake isolation support mechanisms; the cavity formed between the outer body and the inner body is divided into a plurality of outer compartments by the plurality of brake isolation support mechanisms; the brake isolation support mechanisms are provided with a plurality of first diversion channels and a plurality of second diversion channels; the plurality of outer compartments are communicated with each other through the plurality of second diversion channels; and the plurality of inner compartments are communicated with each other through the plurality of first diversion channels.

2. The paired air pressure energy storage device according to claim 1, wherein the brake isolation support mechanism is a brake isolation plate; and the first diversion channels and the second diversion channels are both diversion through holes provided on the brake isolation plate.

3. The paired air pressure energy storage device according to claim 1, wherein the brake isolation support mechanism is a brake isolation plate and a plurality of first barrier plates openably and closably connected to one surface of the brake isolation plate; and in a closed state of the plurality of first barrier plates, the plurality of first barrier plates shield the plurality of first diversion channels.

4. The paired air pressure energy storage device according to claim 3, wherein the second diversion channels are diversion through holes provided in the brake isolation plate.

5. The paired air pressure energy storage device according to claim 3, wherein a plurality of second barrier plates are openably and closably connected to the other surface of the brake isolation plate; and in a closed state of the plurality of second barrier plates, the plurality of second barrier plates shield the plurality of first diversion channels.

6. The paired air pressure energy storage device according to claim 4, wherein a plurality of second barrier plates are openably and closably connected to the other surface of the brake isolation plate; and in a closed state of the plurality of second barrier plates, the plurality of second barrier plates shield the plurality of first diversion channels.

7. The paired air pressure energy storage device according to claim 1, wherein a protective body is sleeved outside the outer body.

8. The paired air pressure energy storage device according to claim 1, wherein the first gas is a high pressure storage gas and the second gas is a low pressure storage gas; or the first gas is a low pressure storage gas and the second gas is a high pressure storage gas.

9. The paired air pressure energy storage device according to claim 8, wherein a pressure of the high-pressure storage gas is greater than a pressure of the low-pressure storage gas; the pressure of the high-pressure storage gas is 0.1 MPa to 100 MPa; and the pressure of the low-pressure storage gas is 100 Pa to 30 MPa.

10. The paired air pressure energy storage device according to claim 1, wherein the first gas and the second gas are simultaneously air, nitrogen, helium or a combination thereof.

11. The paired air pressure energy storage device according to claim 1, wherein the paired air pressure energy storage device is connected with a balance detector for detecting a gas pressure of the first gas and a gas pressure of the second gas; and the balance detector is communicated with the inner body and the cavity, respectively.

12. The paired air pressure energy storage device according to claim 11, wherein the balance detector comprises a first pipe communicated with the inner body and a second pipe communicated with the cavity; a rotatable baffle component is arranged between the first pipe and the second pipe; the baffle component is connected with a pointer; the balance detector is also provided with an indicator disc; and the pointer swings back and forth on the indicator disc according to the rotation of the baffle component.

13. The paired air pressure energy storage device according to claim 12, wherein the first pipe and the second pipe are connected through a detection housing; the baffle component is a baffle plate which is rotatably and sealingly arranged in the detection housing; the pointer is connected with the baffle plate and is located outside the detection housing; and the indicator disc is arranged on an outer wall of the detection housing.

14. The paired air pressure energy storage device according to claim 12, wherein the first pipe and the second pipe are arranged side by side and are respectively provided with baffle vanes; the baffle component comprises a center wheel; a first connecting rod and a second connecting rod are drivingly connected to two sides of the center wheel, respectively; the first connecting rod is connected with the baffle vanes in the first pipe; the second connecting rod is connected with the baffle vanes in the second pipe; and the pointer is located between the first pipe and the second pipe.

15. The paired air pressure energy storage device according to claim 14, wherein the baffle vanes in the first pipe are arranged coaxially and coincident with the first connecting rod; and the baffle vanes in the second pipe are arranged coaxially with and opposite to the second connecting rod.

16. A method for inspecting a gas energy pressure difference using the paired air pressure energy storage device according to claim 1, comprising the steps of:
a) connecting a balance detector among a plurality of paired air pressure energy storage devices, wherein the balance detector is communicated with the inner body of the paired air pressure energy storage device and the cavity of the paired air pressure energy storage device, respectively; and
b) detecting a gas pressure of the first gas in the inner body and a gas pressure of the second gas in the cavity through the balance detector.

* * * * *